United States Patent [19]

Sandstrom et al.

[11] Patent Number: 5,394,919
[45] Date of Patent: Mar. 7, 1995

[54] TIRE WITH RUBBER/CORD BELT LAMINATE

[75] Inventors: Paul H. Sandstrom, Tallmadge; Richard G. Bauer, Kent; Donald J. Burlett, Wadsworth; Mark S. Sinsky, Akron, all of Ohio

[73] Assignee: The Goodyear Tire & Rubber Company, Akron, Ohio

[21] Appl. No.: 79,189

[22] Filed: Jun. 18, 1993

[51] Int. Cl.$^6$ ................................................ B60C 1/00
[52] U.S. Cl. .................................... 152/537; 152/565; 156/910
[58] Field of Search ................... 152/537, 564, 565; 156/910, 124; 428/462, 465, 295; 525/332.6, 343

[56] References Cited

U.S. PATENT DOCUMENTS

| | | | |
|---|---|---|---|
| 2,821,232 | 1/1958 | Wolf | 152/330 |
| 3,451,458 | 6/1969 | Stueber | 152/330 |
| 3,517,722 | 6/1970 | Endter et al. | 152/565 |
| 3,664,403 | 5/1972 | Doran et al. | 152/330 |
| 3,768,537 | 10/1973 | Hess et al. | 152/330 |
| 3,821,133 | 6/1974 | Doran et al. | 152/330 |
| 3,873,489 | 3/1975 | Thurn et al. | 260/33.6 |
| 3,884,285 | 5/1975 | Russell et al. | 152/330 |
| 3,938,574 | 2/1976 | Burmester et al. | 152/330 |
| 3,994,742 | 11/1976 | Russell et al. | 106/288 |
| 4,076,550 | 2/1978 | Thurn et al. | 106/288 |
| 4,203,874 | 5/1980 | Halasa et al. | 525/349 |
| 4,278,587 | 7/1981 | Wolff et al. | 260/42.37 |
| 4,482,663 | 11/1984 | Kraus | 524/99 |
| 4,513,123 | 4/1985 | Day et al. | 525/332.6 |
| 4,519,430 | 5/1985 | Ahmad et al. | 152/209 |
| 4,532,080 | 7/1985 | Delseth et al. | 428/465 X |
| 4,590,052 | 5/1986 | Chevallier et al. | 423/335 |
| 5,085,905 | 2/1992 | Beck | 428/462 |
| 5,087,668 | 2/1992 | Sandstrom et al. | 525/237 |
| 5,089,554 | 2/1992 | Bomo et al. | 524/493 |
| 5,225,011 | 7/1993 | Takino et al. | 152/209 R |
| 5,227,425 | 7/1993 | Rauline | 524/493 |
| 5,239,004 | 8/1993 | Pyke et al. | 525/184 |

FOREIGN PATENT DOCUMENTS

1424503 3/1974 United Kingdom .

OTHER PUBLICATIONS

W. Hofmann, "Vulcanization and Vulcanizing Agents," 1967, pp. 177–179.

*Primary Examiner*—Geoffrey L. Knable
*Attorney, Agent, or Firm*—Henry C. Young, Jr.

[57] ABSTRACT

A laminate of rubber and steel cord, which may be brass coated steel where the rubber is comprised of elastomer, carbon black, optionally silica, dithiodipropionic acid and prescribed methylene donor material. In one aspect, a tire is provided having at least one component as such laminate.

5 Claims, No Drawings

TIRE WITH RUBBER/CORD BELT LAMINATE

FIELD

This invention relates to rubber compositions reinforced with steel cable and tires having at least one component thereof. The tire component is comprised of rubber, particularly sulfur cured rubber, containing carbon black, and optionally silica, in combination with dithiodipropionic acid and a methylene donor.

In one aspect, the component is a rubber skim stock encompassing tire cord reinforcement for the tire.

BACKGROUND

The invention relates to adhering rubber to tire cord reinforcement in a component of a vehicular tire.

Pneumatic rubber tires are conventionally prepared with rubber components which can be a blend of various rubbers which is typically reinforced with a reinforcing pigment such as carbon black.

In one aspect, it is desired to provide rubber compositions which maintain good adhesion to reinforcing tire cord, which is typically in a form of fiber, or fabric, reinforcement, particularly wire reinforcement. A rather conventional method in promoting adhesion between rubber and such fiber reinforcement is to pretreat the reinforcing fiber with a mixture of rubber latex and a phenol/formaldehyde condensation product, or resin, in which the phenol is usually resorcinol. This is often referred to as the "RFL" (resorcinol-formaldehydelatex) method. An alternative method of promoting such adhesion is to form the resin in-situ (in the vulcanized rubber/fiber matrix) by blending the phenol/formaldehyde condensation product (referred to herein as the "in-situ" method).

The components of the condensation product consist of a methylene acceptor and a methylene donor. The most common methylene donors include N-(substituted oxymethyl) melamine, hexamethylenetetramine or hexamethoxymethylmelamine. A common methylene acceptor is a dihydroxybenzene compound such as resorcinol. The in-situ method has been found to be particularly effective where the reinforcing material is steel wire since pretreatment of the wire with the RFL system has been observed to be largely ineffective.

An example of the use of methylene acceptor and methylene donor system may be found in U.S. Pat. No. 3,517,722.

Resorcinol is known to form a resin network within a rubber polymer by reacting with various methylene donors. Unfortunately, the use of resorcinol has some inherent disadvantages. Resorcinol is not readily dispersed in rubber and in fact neither the resin, nor the resorcinol become chemically bound to the rubber. Additionally, resorcinol in its raw form is excessively volatile and is potentially an environmental hazard.

In one aspect it is considered that the resorcinol-formaldehyde acts to beneficially stiffen the rubber composition surrounding the cord reinforcement while the melamine, or tetramine acts to enhance the adhesion of the rubber to the cord, particularly on an aged adhesion basis.

There have been various attempts to replace resorcinol in such a rubber component. However, few if any have had significant success. For example, in U.S. Pat. No. 4,605,696 there is disclosed a method for enhancing adhesion of rubber to reinforcing materials through the use of phenolic esters as the methylene acceptor.

Therefore, there exists a need, or desire, to find, or implement, a suitable resorcinol replacement for use in various tire components.

U.S. Pat. No. 4,513,123 discloses a rubber composition of dithiodipropionic acid with natural rubber, or blends of natural and synthetic rubbers, 30-80 parts carbon black, sulfur and organo-cobalt compound for use as a skim coat for brass-plated steel, It relates that the rubber composition can contain other additives such as fillers such as clays, silicas or calcium carbonate, process and extender oils, antioxidants, cure accelerators, cure activators, cure stabilizers and the like.

SUMMARY AND PRACTICE OF THE INVENTION

In accordance with this invention, a laminate is provided which is comprised of a reinforcing element having a metal surface, which may typically be a metal cord or wire, and rubber bonded to said surface, the rubber comprised of prior to vulcanization, (A) 100 parts by weight of at least one diene-based elastomer, (B) about 0 to about 40, optionally about 5 to about 25, phr particulate silica, (C) about 30 to about 85, optionally about 40 to about 75, phr carbon black, (D) about 0.1 to about 10, preferably about 0.5 to about 5, phr dithiodipropionic acid and (E) about 1 to about 5, preferably about 2.5 to about 4.0, phr of at least one methylene donor selected from hexamethylenetetramine, hexamethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde; wherein the weight ratio of said methylene donor to dithiodipropionic acid is about 1/1 to about 10/1, preferably about 2/1 to about 5/1; and wherein the combined weight of carbon black and silica, if silica is used, is in a range of about 40 to about 95, optionally about 45 to about 95 phr.

Thus, in one aspect of the invention, the rubber composition for the laminate contains a combination of dithiodipropionic acid, carbon black, optionally silica, and the aforesaid methylene donor as cord adhesion enhancing components.

In further accordance with this invention, a pneumatic tire, particularly a rubber tire, is provided having, at least one component thereof, the laminate of this invention.

Typically such component, or laminate, is used in a tire as a steel belt, steel bead, or wire carcass and, thus, is important to contribute to the tire's rolling resistance, handling and durability. The use of steel wire, or cord, reinforced rubber laminated in pneumatic tires for such purpose is well known to those having skill in the tire reinforcement art.

Such tire component, then, can be a laminate of rubber and brass coated steel wire or cord in the form of a belt positioned circumferentially around the tire in the crown portion thereof between the tire tread and the tire carcass plies. The steel bead is conventionally positioned as a radially inner component of the tire, adjacent to its sidewall. The aforesaid tire crown, tread carcass plies, bead and sidewall are well known pneumatic rubber tire components. The laminate can also be in the form of a circumferentially carcass ply in the tire.

In the practice of this invention, for the said methylene donor, hexamethylenetetramine and hexamethoxymethylmelamine are preferred.

In one aspect of the invention, the dithiodipropionic acid is used as a resorcinol replacement in a methylene acceptor (the resorcinol) -methylene donor (e.g. the aforesaid tetramine and/or melamine) combination for enhancing rubber/wire adhesion. While it is recognized that dithiodipropionic acid may exist in isomer forms, such as the 3,3'- and 2,2'-forms, the 3,3'dithiodipropionic acid form is preferred. Thus, in one aspect, it is preferred that the dithiodipropionic acid is primarily 3,3'-dithiodipropionic acid.

In one aspect, such a tire is provided with the rubber component being sulfur cured. The sulfur curing is accomplished in a conventional manner, namely by curing under conditions of elevated temperature and pressure for a suitable period of time.

In one aspect of the invention, it is contemplated, and preferred, that the rubber composition is exclusive of any organo-cobalt compound.

It is considered herein that the coaction of the dithiodipropionic acid, silica if present, and the aforesaid methylene donor for a tire component which contains wire reinforcement is a departure from past practice, particularly for use as a skim stock for cord reinforcement. Indeed, it is considered herein that the dithiodipropionic acid is a suitable replacement for resorcinol-derived resin when used in combination with the methylene donor.

The term "phr" as used herein, and according to conventional practice, refers to "parts of a respective material per 100 parts by weight of rubber, or elastomer".

In the description of this invention, the terms "rubber" and "elastomer" can be used interchangeably, unless otherwise distinguished. The terms "rubber composition", "compounded rubber" and "rubber compound" can be used interchangeably to refer to rubber which has been blended or mixed with various ingredients and materials and such terms are well known to those having skill in the rubber mixing or rubber compounding art.

The dithiodipropionic acid may typically be characterized by having melting point in the range from 153°–159° C. Such melting point can conveniently be determined by a differential scanning calorimeter at a heating rate of 10° C./minute.

In the practice of this invention, the laminate of this invention can be prepared by conventional means, for example, by coating, such as by calendering, the reinforcing wire with rubber which contains the dithiodipropionic acid and methylene donor, as well as carbon black, silica if used, sulfur curative and other compounding aids as described herein.

The reinforcing wire itself may be, for example, a brass coated steel wire, namely a steel wire having a brass coating thereover. The brass coating itself may be applied, for example, by zinc coating the wire followed by applying a thin copper topcoat. By migration, for example, the zinc and copper can combine to form brass. Alternatively, the steel wire may be brass coated by the electroplating of brass onto the steel wire. Such methods of coating steel wire and the use of such coated steel wire for reinforcement in rubber tires is well known to those having skill in such art.

In the practice of this invention, as hereinbefore pointed out, the rubber composition is comprised of at least one diene-based elastomer, or rubber. Thus, it is considered that the elastomer is a sulfur curable elastomer. Such elastomer, or rubber, may be selected, for example, from at least one of cis 1,4-polyisoprene rubber (natural and/or synthetic, and preferably natural rubber), 3,4-polyisoprene rubber, styrene/butadiene copolymer rubbers, butadiene/acrylonitrile copolymer rubbers, styrene/isoprene/butadiene terpolymer rubbers, isoprene/butadiene copolymer rubber and cis 1,4-polybutadiene rubber.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, solution polymerization derived styrene/butadiene rubbers, and cis 1,4-polybutadiene rubber.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The polybutadiene rubber may be conveniently typified, for example, by having at least a 90% cis 1,4-content.

The cis 1,4-polyisoprene and cis 1,4-polyisoprene natural rubber are well known to those having skill in the rubber art.

The vulcanized rubber composition should contain a sufficient amount of carbon black, and silica if used, as reinforcing filler(s) to contribute a reasonably high modulus and high resistance to tear. The combined weight of the silica and carbon black, as hereinbefore referenced, may be as low as about 35 parts per 100 parts rubber, but is preferably from about 40 to about 95 parts by weight.

The commonly employed siliceous pigments used in rubber compounding applications can be used as the silica in this invention, including pyrogenic and precipitated siliceous pigments (silica), although precipitate silicas are preferred.

The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the Journal of the American Chemical Society, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR, silicas available from Degussa AG with, for example, designations VN2 and VN3, and silicas from Akzo Chemical, etc. The PPG Hi-Sil silicas are currently preferred.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of reinforcing type carbon blacks(s), for this invention are hereinbefore set forth. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur, As known to those skilled in the art, sulfur vulcanizing agents are used in an amount ranging from about 0.5 to about 4 phr, or even, in some circumstances, up to about 8 phr, with a range of from about 1.5 to about 2.5, sometimes from 2 to 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of dithiodipropionic acid in combination with the aforesaid methylene donor(s) in rubber compositions.

The mixing of the rubber composition can be accomplished buy methods known to those having skill in the rubber mixing art. For example the ingredients are typically mixed in at least two stages, namely at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, carbon black, and silica if used, as well as the dithiodipropionic acid and methylene donor may be mixed in one or more non-productive mix stages. The terms "non-productive" and "productive" mix stages are well known to those having skill in the rubber mixing art.

The tire can be built, shaped, molded and cured by various methods which are known and will be readily apparent to those having skill in such art.

The invention may be better understood by reference to the following examples in which the parts and percentages are by weight unless otherwise indicated.

EXAMPLE I

Rubber compositions comprised of the materials identified in Table 1 were mixed in a BR Banbury mixer using three separate stages of addition, namely, two non-productive mix stages and one productive mix stage. The sequential steps of mixing rubber in nonproductive and productive stages is well known to those skilled in such art.

Table 2 shows the cure behavior and cured properties for a control using resorcinol (Sample A) and the experimental compounds which contained various ratios of dithiodipropionic acid and hexamethoxymethylmelamine (Samples B through F) which were prepared according to the recipe of Table 1. All of the experimental compounds are observed to exhibit equal to higher tensile strength, higher 100 and 300% modulus and higher rebound than the resorcinol control. Rheovibron results also show higher stiffness (E') and lower tan delta for the experimental compound. The results for the experimental compounds on aged wire adhesion (10 days $H_2O$ ) and peel adhesion of the compounds to themselves are observed to show what is an important and perhaps critical relationship between dithiodipropionic acid and hexamethoxymethylmelamine ratio. The observed results indicate that the ratio should be at least 2:1 hexamethoxymethylmelamine to dithiodipropionic acid in order to obtain an optimum aged wire adhesion and tear resistance.

TABLE 1

| Material | Parts |
| --- | --- |
| 1st Non-Productive | |
| Cis 1,4-Polyisoprene Rubber[1] | 100.00 |
| Carbon Black | 35.00 |
| Processing Oil | 5.00 |
| Zinc Oxide | 5.00 |
| Fatty Acid | 2.00 |
| Antioxidant | 2.00 |
| 2nd Non-Productive | |
| Carbon Black | 15.00 |
| Resorcinol | variable |
| Dithiodipropionic Acid | variable |
| Productive | |
| Sulfur | 4.00 |
| Accelerator[2] | 0.60 |
| Hexamethoxymethylmelamine | variable |

[1]Obtained as NAT 2200 ® as a synthetic cis 1,4-polyisoprene rubber from The Goodyear Tire & Rubber Company.
[2]Of the sulfenamide type.

measured by stress-strain modulus, hardness and Rheovibron E' than the corresponding combination of resorcinol and hexamethoxymethylmelamine (Control Sample G). It is also clearly evident that the use of the dithiodipropionic acid would also predictively provide a rubber with lower hysteresis as shown by rebound and tan delta measurements. Surprisingly, in spite of its higher modulus (Compound H) the dithiodipropionic acid is also observed to provide higher tear strength as measured by peel adhesion itself.

TABLE 3

| Material | Parts |
| --- | --- |
| 1st Non-Productive | |
| Cis 1,4-Polyisoprene Rubber | 100.00 |
| Carbon Black | 35.00 |
| Processing Oil | 5.00 |
| Zinc Oxide | 5.00 |
| Fatty Acid | 2.00 |
| Antioxidant | 2.00 |
| 2nd Non-Productive | |
| Silica | 15.00 |
| Resorcinol | variable |
| Dithiodipropionic Acid | variable |
| Productive | |
| Sulfur | 1.40 |
| N-tert-butyl-2-benzothiazole sulfenamide | 1.00 |
| Hexamethoxymethylmelamine | variable |

TABLE 2

| Sample # | A | B | C | D | E | F |
| --- | --- | --- | --- | --- | --- | --- |
| Resorcinol | 2.5 | 0 | 0 | 0 | 0 | 0 |
| Dithiodipropionic Acid | 0 | 2.5 | 2.0 | 1.5 | 1.5 | 1.5 |
| Hexamethoxymethylmelamine | 2.5 | 2.5 | 2.5 | 2.5 | 3.0 | 3.5 |
| Rheometer (150° C.) | | | | | | |
| Max. Torque | 57.3 | 63.7 | 63.0 | 62.7 | 62.9 | 62.4 |
| Min. Torque | 10.5 | 10.0 | 10.0 | 9.7 | 9.9 | 9.7 |
| Delta Torque | 46.8 | 53.7 | 53.0 | 53.0 | 53.0 | 52.7 |
| $T_{90}$, minutes | 15.5 | 27.5 | 25.75 | 24.5 | 25.0 | 26.0 |
| $T_{25}$, minutes | 4.25 | 7.5 | 7.5 | 7.25 | 7.5 | 7.75 |
| Stress-Strain | | | | | | |
| Tensile Strength, MPa | 18.1 | 20.7 | 20.1 | 17.7 | 19.4 | 19.5 |
| Elongation at Break, % | 416 | 390 | 375 | 336 | 371 | 77 |
| 100% Modulus, MPa | 3.57 | 4.52 | 4.59 | 4.40 | 4.40 | 4.39 |
| 300% Modulus, MPa | 13.42 | 17.19 | 17.36 | 17.13 | 16.93 | 16.73 |
| Rebound | | | | | | |
| 100° C., % | 60.4 | 64.3 | 64.6 | 64.7 | 64.5 | 64.1 |
| Hardness | | | | | | |
| 100° C. | 72.1 | 71.1 | 70.6 | 71.1 | 70.8 | 70.7 |
| Rheovibron | | | | | | |
| E' at 60° C., MPa | 23.5 | 27.2 | 28.8 | 28.0 | 28.9 | 25.8 |
| Tan Delta at 60° C. | .069 | .052 | .052 | .055 | .050 | .053 |
| Wire Adhesion, RT | | | | | | |
| Original | 571 | 551 | 530 | 451 | 462 | 474 |
| Aged, 10 days $H_2O$, 90° C. | 413 | 91 | 91 | 162 | 252 | 502 |
| Aged, 20 days, 90% R.H., 75° C. | 705 | 780 | 754 | 650 | 743 | 755 |
| Peel Adhesion, 95° C. | | | | | | |
| Newtons | 83 | 39 | 38 | 33 | 62 | 65 |

EXAMPLE II

Rubber compositions comprised of the materials shown in Table 3 were mixed in a BR Banbury mixer using three separate stages of addition. The compositions contained 35 parts carbon black and 15 parts silica whereas the compositions in Example 1 contained only 50 parts carbon black.

Table 4 shows the cure behavior and cured properties for a control using resorcinol (Sample G) and the experimental sample using the dithiodipropionic acid (Sample H). It is clearly evident that the combination of dithiodipropionic acid and hexamethoxymethylmelamine in the presence of carbon black and silica fillers is observed to be more effective at providing stiffness as

TABLE 4

| Sample # | G | H |
| --- | --- | --- |
| Resorcinol | 2.5 | 0 |
| Dithiodipropionic Acid | 0 | 2.5 |
| Hexamethoxymethylmelamine | 2.5 | 2.5 |
| Rheometer (150° C.) | | |
| Max. Torque | 31.6 | 43.0 |
| Min. Torque | 8.7 | 9.0 |
| Delta Torque | 22.9 | 34.0 |
| $T_{90}$, minutes | 28.0 | 27.0 |
| $T_{25}$, minutes | 9.75 | 14.75 |
| Stress-Strain | | |
| Tensile Strength, MPa | 7.68 | 19.69 |
| Elongation at Break, % | 439 | 566 |

TABLE 4-continued

| Sample # | G | H |
| --- | --- | --- |
| 100% Modulus, MPa | 1.44 | 2.29 |
| 300% Modulus, MPa | 4.80 | 9.15 |
| Rebound | | |
| 100° C., % | 48.7 | 57.8 |
| Hardness | | |
| 100° C. | 57.6 | 63.3 |
| Rheovibron | | |
| E' at 60° C., MPa | 13.9 | 24.5 |
| Tan Delta at 60° C. | .124 | .070 |
| Peel Adhesion, 95° C. | | |
| Newtons | 149 | 204 |

EXAMPLE III

A pneumatic rubber passenger tire is prepared with a belt of a laminate of rubber and brass coated steel wire of this invention, where said belt is positioned circumferentially around the tire in the crown of the tire between the tire tread and the tire carcass plies.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having, at least one component, a laminate of rubber and a brass coated steel cord, wherein said laminate is the form of a belt ply positioned circumferentially around the tire in the crown portion thereof between the tire tread and tire carcass plies, and wherein said rubber of said laminate is comprised of (A) 100 parts by weight of at least one diene-based elastomer, (B) about 5 to about 25 phr particulate, precipitated silica, (C) about 40 to about 75 phr carbon black, and (D) about 0.5 to about 5 phr dithiodipropionic acid and (E) about 2.5 to about 4 phr of at least a methylene donor consisting essentially of hexamethoxymethylmelamine; wherein the weight ratio of said hexamethoxymethylmelamine to dithiodipropionic acid is about 2/1 to about 5/1; wherein the total amount of carbon black and silica is in a range of about 45 to about 90 phr; and wherein said rubber composition of said laminate is exclusive of any cobalt compound.

2. The tire of claim 1 wherein, for the said laminate, the diene based elastomer is selected from at least one of cis 1,4-polyisoprene rubber, 3,4-polyisoprene rubber, styrene/butadiene copolymer rubbers, styrene/isoprene/butadiene terpolymer rubbers, isoprene/butadiene copolymer rubber and cis 1,4-polybutadiene rubber.

3. The tire of claim 1, wherein, for the said laminate, the elastomer is at least two diene based rubbers selected from at least two cis 1,4-polyisoprene natural rubber, 3,4-polyisoprene rubber, styrene/isoprene/butadiene rubber, solution polymerization derived styrene/butadiene rubber, isoprene/butadiene copolymer rubber and cis 1,4-polybutadiene rubber.

4. The tire of claim 1 wherein, for the said laminate, silica is characterized by having a BET surface area in a range of about 50 to about 300 square meters per gram and dibutylphthalate (DBP) absorption value in a range of about 150 to about 300.

5. The tire of claim 1 wherein the dithiodipropionic acid is primarily 3,3'-dithiodipropionic acid.

* * * * *